United States Patent [19]

McNeill

[11] 4,414,852

[45] Nov. 15, 1983

[54] AUTOMATIC ZERO BALANCE CIRCUIT

[75] Inventor: Thomas J. McNeill, Lyndhurst, Ohio

[73] Assignee: Gould Inc., Rolling Meadows, Ill.

[21] Appl. No.: 301,628

[22] Filed: Sep. 14, 1981

[51] Int. Cl.³ .......................... G01B 7/00; H04B 1/12
[52] U.S. Cl. ...................................... 73/765; 73/1 R;
73/769; 324/130; 328/166
[58] Field of Search .................. 73/708, 753, 765, 766,
73/769, 1 R; 324/83 FE, 83 Q, 130, 131;
328/166; 340/347 CC

[56] References Cited

U.S. PATENT DOCUMENTS

| 3,244,987 | 4/1966  | Prapis et al. |             |
|-----------|---------|---------------|-------------|
| 3,249,868 | 5/1966  | Sheftelman    |             |
| 3,278,847 | 10/1966 | Widenor       |             |
| 3,463,934 | 8/1969  | Nobis         | 73/1 R X    |
| 3,633,117 | 1/1972  | Reilly, Jr.   | 324/83 Q X  |
| 3,641,563 | 2/1972  | Cushman et al.| 340/347 CC X|
| 3,701,012 | 10/1972 | Lang          |             |
| 3,757,214 | 9/1973  | Kaufman       |             |
| 3,784,912 | 1/1974  | Van Aken      | 340/347 CC X|
| 3,806,802 | 4/1974  | Hamlet        |             |
| 3,824,481 | 7/1974  | Sponholz et al.| 340/347 CC X|
| 3,986,113 | 10/1976 | Vifian        |             |
| 4,120,229 | 10/1978 | Ota           |             |
| 4,122,391 | 10/1978 | Harp et al.   |             |
| 4,156,183 | 5/1979  | Schuon        |             |

OTHER PUBLICATIONS

Mallinson—"8-Bit DAC's Give 15-Bit Resolution in Sample-and-Hold Circuit", Electronic Design 26, Dec. 20, 1979, pp. 90, 92.

Primary Examiner—Charles A. Ruehl
Attorney, Agent, or Firm—Edward E. Sachs; John C. Tiernan; Barry L. Tummino

[57] ABSTRACT

An automatic zero balance circuit for nulling the initial offset signal received from a test transducer. A quadrature oscillator powers a carrier transducer with the phase reference signal. A summing circuit receives the return signal from the transducer and sums it with two other signals. The resultant summation signal is divided into two components, the phase reference component and the quadrature reference component which are fed back into the summing circuit as the two other signals. The component values nullify the return signal thereby cancelling the initial offset signal.

16 Claims, 8 Drawing Figures

AUTOMATIC ZERO BALANCE CIRCUIT

DESCRIPTION

Technical Field

The present invention relates to measuring circuits and is more particularly directed to an automatic zero balance circuit for use with carrier-type transducers.

Background Art

Carrier type transducers are known in the art. These transducers may take the form of resistive bridges or linear voltage differential transformers and are excited by a sinusoidal drive signal. When the transformer slug is displaced or the transducer is stressed an AC signal output is produced that is proportional to the amount of stress or displacement applied to the transducer. For example, a restitive type transducer may be placed onto a beam to measure the beam flexure under stress. The resistor values of the bridge are typically selected so the output signal from the transducer will be zero volts AC when the beam is in an unloaded condition. Once the beam is flexed, an AC output voltage is produced proportional to the amount of the overall flexure. Unfortunately, several factors will typically cause the transducer to exhibit an initial AC output voltage even for an unloaded condition. There are several reasons for this occurrence, such as stray capacitance in the lines leading to the transducer, stray capacitance in the transducer itself, or the tare weight of the beam can cause an initial stressing or displacement of the transducer. Another problem encountered in carrier transducers is that the output signal from the transducer is shifted in phase with respect to the sinusoidal drive signal. This phase shift in the output signal makes it more difficult to correct or nullify the initial reading. The prior art discloses several ways of nullifying the AC signal exhibited by the transducer for an initial reading of the transducer for an unloaded condition or at the zero position of the member being measured.

Some prior art devices attempt to null out the initial zero position AC signal from the transducer by summing a cancellation AC signal generated from an appropriate source of identical frequency as the excitation frequency except 180° out of phase therefrom. The problem in attempting to null out the initial zero position AC signal from the transducer in this manner is the phase shift that occurs between the output of the transducer and the drive signal. The cancellation AC signal would need to be 180° out of phase with the return signal from the transducer before cancellation would occur. Phase shifts in the zero position output signal are extremely troublesome in linear voltage differential transformer (LVDT) type transducers. In those type of transducers the excitation signal is connected to a primary coil. A secondary bucking coil is placed in juxtaposition with the primary excitation coil. A slug is introduced in a position between the coils such that zero volts AC will be exhibited at the output of the bucking coils for the initial unloaded condition on the zero position of the slug.

Another prior art device nulls out the AC signal from the carrier transducer by summing phase shifted signals with the return signal of the carrier transducer. Such a device compensates for the phase shifted output signal from the transducer. The device feeds the excitation signal into two variable RC circuits to produce two phase shifted signals. The two signals are then summed with the return signal from the transducer in an attempt to nullify the initial zero position signal. Such a device requires two controls, a 0° phase offset and a 90° phase offset. These controls require the operator of the measuring device to make tedious and time consuming adjustments for the transducer being used. If the operator disconnects the carrier transducer and replaces it with another carrier transducer or a different type of carrier transducer, the adjustments and calibration procedure have to be made again since each transducer will exhibit different zero position offset signals.

Another circuit is disclosed in U.S. Pat. No. 3,806,802 to Hamlet, with an automatic quadrature control and measuring system. The circuit disclosed in Hamlet uses a Raysistor optical coupling control device to connect the output from a detection system to a circuit driven by a signal based upon a primary signal. A combining circuit combines the primary signal and the circuit controlled by the Raysistor device to subtract the quadrature component. Such a device however will not give an accurate reading for different transducers that exhibit different phase shifts. Although the quadrature component would be cancelled out by such a device for a particular transducer, the phase component would still be present. The value of the phase component will vary from transducer to transducer.

another circuit is disclosed in U.S. Pat. No. 3,244,987 to Prapis et al. That patent shows a quadrature rejection circuit that receives a reference signal and an input signal, the input signal having an in-phase and a quadrature phase component. The resultant output signal is proportional only to the in-phase component which is not affected by the quadrature component, thus providing complete quadrature rejection. The difficulty with this type of rejection circuit is that the output signal is only a proportional type signal which will have an initial variance depending on the particular transducer used. Also, only the quadrature component is removed still leaving the phase component. Again the value of the remaining phase component will vary from transducer to transducer.

Another circuit is disclosed in U.S. Pat. No. 3,757,214 to Kaufman. This patent discloses a programmable multi-mode, phase sensitive volt meter in which the component received is examined with respect to either the in-phase or the quadrature phase of the reference signal. The reference signal is then shifted in a variable phase shifter having two wide band multipliers in such a manner that the in-phase component of the reference signal is maximized and the quadrature component of the reference signal is minimized. The test signal is multiplied by the in-phase shifted reference signal. The resulting signal is a measure of the total value of only the fundamental component of the test signal. This circuit requires the shifting of the reference signal and a measuring with respect to the shifted signal. The circuit does not truly nullify or attempt to nullify the signal coming from the transducer.

An object of the present invention is to provide an automatic zero circuit that will overcome the difficulties and disadvantages of the prior devices.

Another object of the present invention is to provide an automatic zero circuit for use with transducers that will automatically null the zero position output signal.

Yet, another object of the present invention is to provide an automatic zero circuit which will rezero the zero position output signal from the transducer when a different transducer is used in the measuring system.

Still another object of the present invention is to provide an automatic zero circuit for use with DC test signals that will automatically null the offset signal.

The objects are given by way of example. Thus, other desirable objectives and advantages achieved by the invention will occur to those skilled in the art.

DISCLOSURE OF THE INVENTION

The invention provides a new method and automatic zero balance circuit especially adapted for use with carrier transducers. The new method and circuit is designed to separate the return signal from the carrier transducer into a phase component and a quadrature component with respect to a reference quadrature oscillator. The present invention generates two sinusoid signals corresponding to the phase and quadrature components. These two sinusoidal signals are summed with the return signal. The resultant summation will equal zero thus completely nulling the zero position signal from the transducer.

The automatic zero balance circuit of the invention comprises a reference generator outputing a phase reference signal and a quadrature reference signal, a summing circuit for receiving a return signal from a test device powered by said reference generator for summing said return signal with at least one other signal, and means operatively connected to said summing circuit for automatically separating the return signal into a phase reference component and a quadrature reference component with respect to said reference generator and for automatically generating said at least one other signal such that said return signal will be completely nulled.

The method of automatically nulling the zero position offset signal from a carrier transducer comprises the steps of generating a phase reference sinusoidal signal and a quadrature reference sinusoidal signal, driving the transducer with the phase reference sinusoidal signal, receiving the output signal from the transducer, summing the received signal with at least one other signal, demodulating the summed signal with respect to the phase reference and quadrature reference sinusoidal signals, converting the demodulated signals into direct current signals, generating modulated signals which are proportional to the direct current signals which were converted, counting the modulated signals generated, and converting the counted modulated signals into a modulated analog null signal in phase into a modulated analog null signal in phase with the phase reference and the quadrature reference signal, the converted counter modulated signals being the at least one other signal.

In preferred embodiments, a quadrature oscillator generates a phase reference signal and a quadrature reference signal. The phase reference signal is amplified and drives the carrier transducer. The output signal or the return signal from the carrier transducer is fed into a summing amplifier. The amplified carrier transducer signal is operatively connected to a zero phase demodulator and a 90° phase demodulator. The two demodulators are connected also to the phase reference and the quadrature reference signals from the quadrature oscillator, respectively. The output of each of the demodulators is a signal that is a function of the reference signal. The demodulated output signals are fed into filters to generate DC levels proportional to the initial zero position output signal from the transducer. The DC output signal from each demodulator filter network is operatively connected to individual voltage controlled oscillators. The output signals of the voltage controlled oscillators will vary directly as a function of the DC input signal, i.e., the higher the level of the DC input signal into the voltage controlled oscillator, the higher the output frequency therefrom. The output signal from each voltage controlled oscillator is operatively connected to an up/down counter. Each up/down counter is operatively connected to a digital to analog converter to convert the count signal from each of the voltage controlled oscillators back into analog signals. The digital to analog converters are operatively connected to the phase reference and the quadrature reference signals of the quadrature oscillator to synchronize its output signal. The signals from the digital to analog converters are also operatively connected back to the summing amplifier. The signals from the digital to analog converters are summed with the output signal from the carrier transducer to nullify the phase component and the quadrature component of the output signal from the carrier transducer. Once these signals have been nulled out, the closed loop of the circuit will be satisfied and a controller operatively connected to the outputs of the filters and the voltage control oscillators will latch the up/down counters at the appropriate count to maintain a nulled signal for the zero position output signal from the carrier transducer.

If a different transducer is substituted, the controller of the automatic zero circuit is reset and the circuit will automatically nullify the zero position output signal from the new carrier transducer used.

Another feature of the invention is the provision for a reset switch to permit the re-zeroing of the return signal for a new zero position.

Other features and advantages and a fuller understanding of the invention will be had from the following detailed description and the accompanying drawings.

BEST MODE FOR CARRYING OUT THE INVENTION

A description of the invention follows, referring to the drawings in which like reference numerals denote like elements of structure in each of the several figures.

Figure 1:
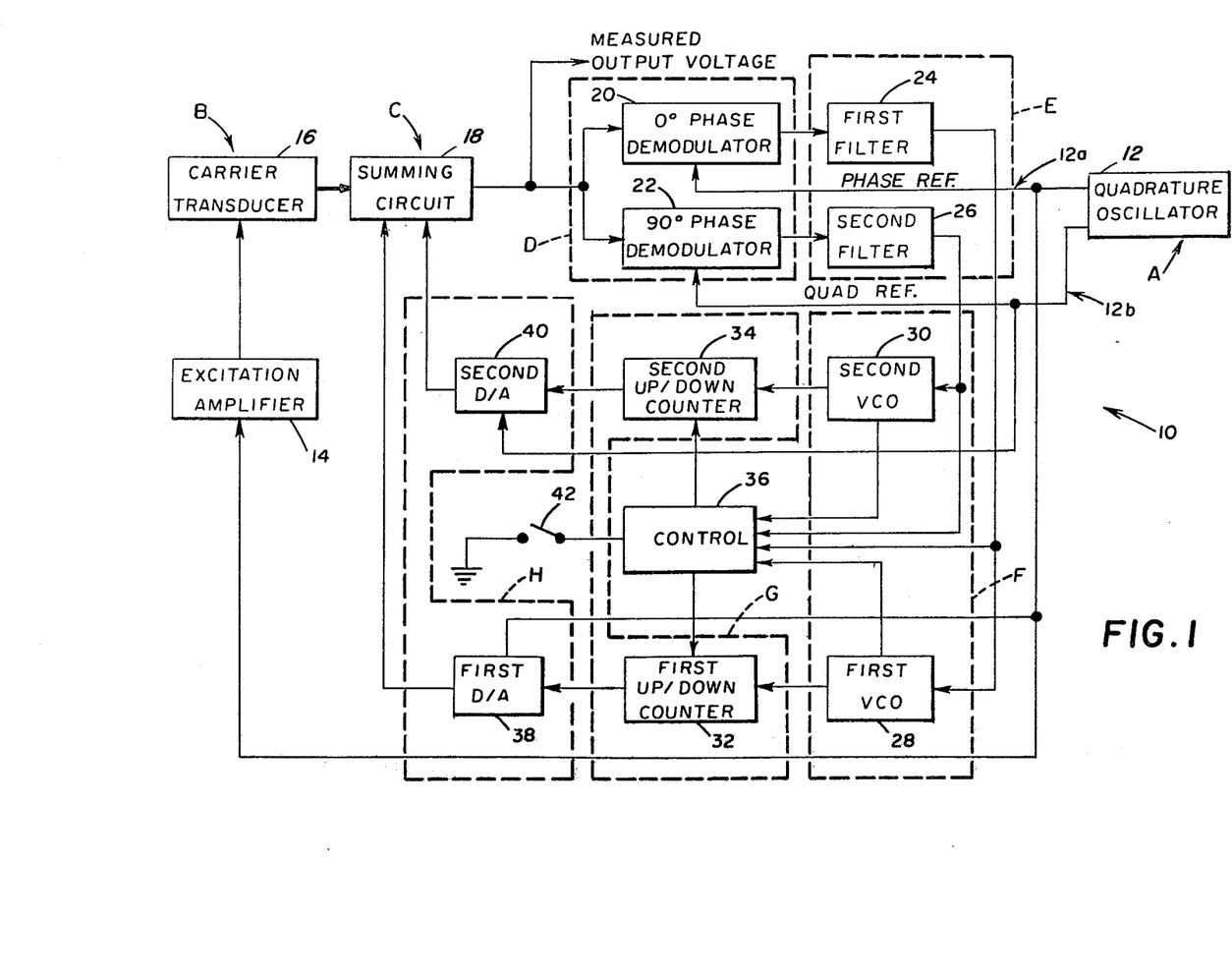
FIG. 1 is a block diagram of the present invention.

Referring now to FIG. 1, the automatic zero balance circuit 10 comprises a reference generator A that outputs a phase reference signal and a quadrature reference signal. The phase reference signal drives a carrier type transducer B. A summing amplifier C receives the return signal from the carrier transducer B and sums it with at least one other signal. A demodulator D demodulates the resultant summation with respect to the phase reference signal and the quadrature reference signal. A first converter E filters the demodulated signals into DC levels. The output of converter E is the return signal from carrier transducer B separated into a phase reference component and a quadrature reference component. An oscillator F converts the DC levels from first converter E into a frequency proportional to the DC level. A counter G counts the cycles from the oscillator F. A second converter H converts the output of the counter G back into a modulated analog signal in synchronization with the phase reference signal and the quadrature reference signal. The level of the output of H is a function of the value of the count of counter G. The output from second converter H are summed with the return signal in summing amplifier C. As those skilled in the art will appreciate, the return signal is separated into two components, the value of the components are determined, individual signals corresponding to each of the return signal components are generated and are summed with the return signal to null it to zero. A more detailed explanation will aid in the better appreciation of the present invention.

Referring again to FIG. 1, there is provided a reference generator or quadrature oscillator A that generates two sinusoidal reference signals. The first reference signal output 12a is the phase reference signal and the second reference signal output 12b is the quadrature reference signal. The quadrature reference signal 12b is identical to the phase reference signal 12a except that it is exactly 90° out of phase therefrom. As is known in the art, the phase reference signal can also be designated as the sine signal and the quadrature reference signal can be designated as the cosine signal. The phase reference signal 12a is operatively connected to an excitation amplifier 14 for the purpose of amplifying the phase reference signal to drive the carrier transducer that is to be utilized. If the quadrature oscillator 12 were to generate a phase reference signal with sufficient drive capabilities, the excitation amplifier 14 typically would not be utilized. However, as a practical consideration, the excitation amplifier also provides a certain amount of isolation between the quadrature oscillator and the carrier transducer itself. A carrier transducer B is operatively connected to the output of the excitation amplifier 14. If the excitation amplifier 14 were not needed, the carrier transducer B would be operatively connected to the phase reference signal 12a directly.

Figure 2:
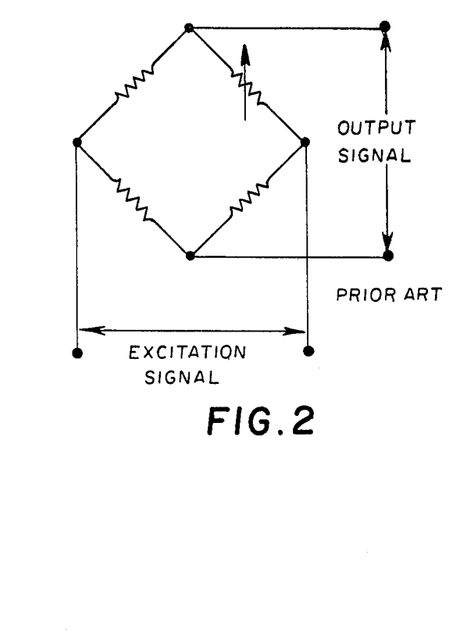
FIG. 2 is a schematic drawing of a typical resistive bridge carrier transducer known in the art.
Figure 3:
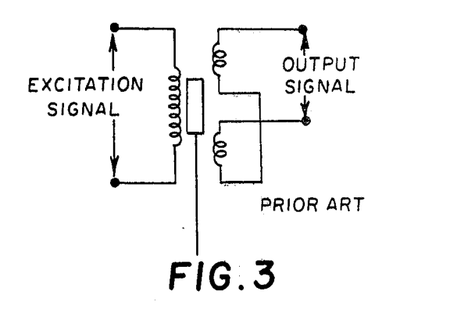
FIG. 3 is a schematic drawing of a typical linear voltage differential transformer known in the art which is used as a carrier transducer.

The present invention contemplates the use of any type of carrier type transducer known in the art, such as a resistive bridge transducer shown in FIG. 2 or a linear voltage differential transformer shown in FIG. 3. These types of carrier transducers, for example, can be utilized to detect the deflection in a beam. In a resistor type bridge the resistor values in the bridge are usually selected to produce an output signal equal to zero when the bridge is in an unloaded condition. However, variances in the resistive values of the resistive components and stray capacitance due to long lead lines and stray capacitance within the bridge itself will typically cause an initial output signal to appear even during the unloaded condition of the bridge. A similar problem occurs in the linear voltage differential transformer type transducers in that it is difficult to locate the slug in a zero position. Also, internal capacitance and inductance of the transformer will cause an output signal to occur.

An operator of the measuring device may choose to have the transducer under an initial displacement to begin his measurements but would like to have the initial output voltage nulled so that further displacements of the transducer would be measured with reference to initial displacement. For the purposes of this application, such an initial displacement will also be referred to as the zero position of the transducer.

Not only will an initial offset voltage be present at the output of the transducer B for an initial condition, but the offset voltage may be phase shifted with respect to the phase reference drive signal 12a.

The output of the carrier transducer is operatively connected to a summing circuit C. A summing amplifier is preferably used since the signals from the carrier transducer are typically low in level. To increase the sensitivity of the carrier transducer for measurement purposes, it is desirable to amplify the output signal. The output of the summing amplifier C is operatively connected to a demodulator D. The demodulator D comprises a zero phase demodulator 20 and a 90° phase demodulator 22. The zero phase demodulator 20 is operatively connected to receive the phase reference signal 12a from the quadrature oscillator A. The 90° phase demodulator 22 is operatively connected to receive the quadrature reference signal 12b from the quadrature oscillator 12. Therefore, the zero phase demodulator 20 will be comparing and demodulating the signal from the carrier transducer B with reference to the phase reference signal. The 90° phase demodulator will be comparing and demodulating the signal from the carrier transducer 16 with reference to the quadrature reference signal.

Figure 4:
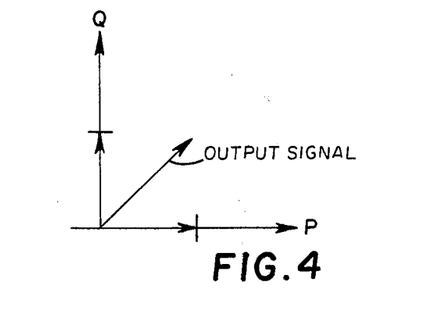
FIG. 4 shows a graphical plot of the output signal from the carrier transducer showing the phase component on the X axis and the quadrature component on the Y axis.

The output signal from the summing amplifier can be better understood by the plot shown in FIG. 4. FIG. 4 is a pictorial representation of the output signal or return signal from the carrier transducer 16. The output signal may be out of phase with the initial excitation signal. The output signal can be represented as having two individual components, a phase component and a quadrature component. If the output signal had no phase shift with respect to the excitation signal, the output signal would then totally lie upon the phase axis P, and the quadrature component would equal zone. If the output signal were to be phase shifted 90° with respect the excitation signal, the output signal would then lie totally upon the quadrature axis Q and the phase component would equal zero. In a typical type carrier transducer, the output phase shift is typically less than 45°. The demodulator D determines and separates the quadrature component and the phase component and produces two output signals indicative thereof.

The outputs from the demodulator D are operatively connected to a first converter E that comprises a first filter 24 and a second filter 26. In particular, the output of zero demodulator 20 is operatively connected to the first filter 24 and the output of the 90° phase demodulator 22 is operatively connected to the second filter 26. The output of the first and second filters 24, 26 will be DC voltages that are a function of the demodulator outputs. The DC voltage from first filter 24 will be the DC value of the phase component of the return signal. The DC voltage from the second filter 26 will be the DC value of the quadrature component of the return signal.

The first converter E is operatively connected to an oscillator F that comprises a first voltage controlled oscillator 28 and a second voltage controlled oscillator 30. In particular the output of first filter 24 is operatively connected to first voltage controlled oscillator 28. The output of second filter 26 is operatively connected to second voltage controlled oscillator 30. The voltage controlled oscillators 28, 30 generate frequencies which are a function of the input voltages.

Oscillator F is operatively connected to a counter G that comprises first up/down counter 32 and second up/down counter 34. In particular, the output of second voltage control oscillator 30 is operatively connected to second up/down counter 34. The up/down counter 34 will count the frequency output from the second voltage control oscillator 30. First voltage control oscillator 28 is operatively connected to first up/down counter 32. First up/down counter 32 will count the output frequency from first voltage controlled oscillator 28. Both up/down counters will produce a digital output that represents the input frequency.

A controller 36 monitors the output signals from first filter 24, second filter 26, first voltage controlled oscillator 28, and second voltage controlled oscillator 30. The controller 36 is operatively connected to both first up/down counter 32 and second up/down counter 34.

Counter G is operatively connected to second converter H that comprises a first digital to analog converter 38 and a second digital to analog converter 40. In particular, the output of the first up/down counter 32 is operatively connected to the first digital to analog converter 38. First digital to analog converter 38 will convert the digital output count received from the first up/down counter 32 into an analog signal. First digital to analog converter 38 is operatively connected to the phase reference output signal 12a from quadrature oscillator 12. The output signal from the digital to analog converter 38 is synchronized with the phase reference output signal. The output signal from the second up/down counter 34 is operatively connected to second digital to analog converter 40. The function of second digital to analog converter is identical to that of first digital to analog converter 38 in that it will convert the digital output count from second up/down counter 34 to an analog signal. Second digital to analog converter 40 is operatively connected to the quadrature reference output signal 12b of quadrature oscillator 12. The output signal from second digital to analog converter 40 is synchronized with the quadrature reference output signal. Both the outputs of first digital to analog converter 30 and second digital to analog converter 40 are operatively connected to summing amplifier 18.

A switch 42 operatively connected to control 36 is provided for resetting the control 36.

In operation, the carrier transducer 16 is driven by the phase reference output signal 12a from the reference oscillator 12 through excitation amplifier 14. The output from the carrier transducer is then amplified by summing amplifier 18. For the moment, the two inputs from the digital to analog converters 38 and 40 are not of concern. The output signal from the summing amplifier 18 is then received by the zero phase demodulator 20 and the 90° phase demodulator 22.

Figure 5A:
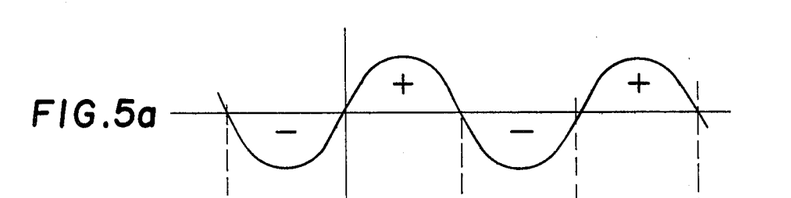
FIGS. 5A–5C are graphical representations of the operation of the phase demodulators of the present invention.
Figure 5B:
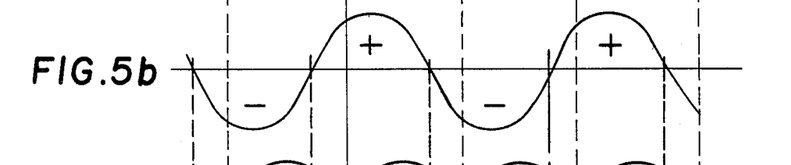
Figure 5C:
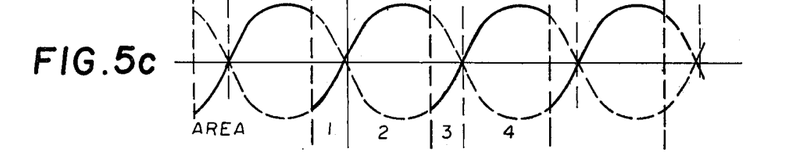

Referring now to FIG. 5, the operation of the demodulators can be better appreciated. FIG. 5A represents the phase reference signal from the quadrature oscillator 12. FIG. 5B represents the output signal from the carrier transducer which is received by the phase demodulator. The 0° phase demodulator will demodulate the signal received from the carrier transducer with respect to the phase reference signal from the quadrature oscillator 12. FIG. 5C represents the demodulated output signal. As can be seen from FIG. 5C and as will be appreciated by those skilled in the art, the demodulated output signal is a function of the phase reference signal from the quadrature oscillator 12. The phase reference signal can be seen as dotted lines in 5C with the upper portion representing the phase reference signal and the lower portion representing the phase reference signal 180° out of phase. The output of the demodulator will follow the patterns set up by the dotted lines in FIG. 5C. Whether the output of the demodulated signal will follow the dotted line pattern in the positive or negative quadrant is a function of the multiplication of the quadrant locations of the phase reference signal and the output signal from the carrier transducer. As can be seen in area 1 of the figures the phase reference signal depicted in FIG. 5A is in the negative quadrant while the output signal from the carrier transducer in FIG. 5B is in the positive quandrant. Multiplying the signs of these two quadrants in area 1 yields a negative. Therefore, the output of the demodulator will follow the dotted line pattern in the negative quadrant in area 1. In area 2 both the reference signal and the output from the carrier transducer are in the positive quadrant. Therefore, the output of the demodulator will follow the dotted line pattern in the positive quandrant. In area 3 the reference signal is in the positive quadrant and the output from the carrier transducer is in the negative quadrant. Therefore area 3 will follow the dotted line pattern in the negative quadrant. In area 4 both the reference signal and the output signal from the carrier transducer is in the negative quadrant. The multiplication of these two negative quadrants will give a positive signal. Therefore the output of the demodulator will follow the dotted line pattern in the positive quadrant in area 4. As those skilled in the art will appreciate, the closer in phase the output of the carrier transducer is with respect to the phase reference signal, the more the output from the zero 0° demodulator will be in the positive quadrant. When the output of the carrier transducer is exactly 180° out of phase from the phase reference signal, the output from the 0° phase demoduator will be completely in the negative quadrant. The operation of the 90° phase demodulator works the same as the 0° phase demodulator except that the 90° phase demodulator will demodulate the return signal from the transducer with respect to the quadrature reference signal. The demodulator D thus determines and separates the return signal into a phase component and a quadrature component.

The demodulated signal from the 0° phase demodulator 20 is converted by first filter 24 into a DC level. The value of the DC level will be a function of the output signal from the demodulator. As those skilled in the art will appreciate, first filter 24 may take the form of an RC network. In turn, the output from the 90° phase demodulator 22 is converted into a DC level by second filter 26. Again the value of the DC level will be a function of the demodulator output. The outputs from first and second filters 24, 26 represents the DC values of the phase component and the quadrature components respectively of the return signal.

The output of the oscillator F will be a function of the two DC level inputs. The higher the DC input, the higher the output frequency from the voltage control oscillators. The counters 32, 34 will count the frequencies from the voltage controlled oscillators 28, 30, respectively. The second converter H will convert the digital count from the counter G back into an analog signals to be summed with the output signal from the carrier transducer. The analog signals produced by the second converter H are the analog form of the phase and quadrature components of the return signal except being opposite in polarity. In order to get the output signals from the second converter in sequence with the separate components of the return signal to be nulled, each of the digital to analog converters within the second converter H are operatively connected to the two reference signals from the quadrature oscillator 12. The two outputs from the second converter H will be the null signals for the phase component and the quadrature component of the output signal from the carrier transducer 16. Summing amplifier 18 will sum the two null signals from the second converter H with the return signal from carrier transducer 16. The measured output voltage from the summing amplifier 18 will thus equal zero.

Control 36 monitors the outputs of the first converter E and the oscillator F. Control 36 is operatively connected with counter G in order to control when the counters stop counting. The stop counting condition occurs when the carrier transducer output signal has been nulled to zero. When the return signal has been completely nulled, the output of first converter E will go to zero volts DC and the oscillator F will not be producing any signals. The purpose of having control 36 will be appreciated by those skilled in the art. The present invention nulls the initial zero position return signal from the carrier transducer. The invention generates two components necessary to null this initial signal. The control holds the count at the null condition so that the counters memorize the value of the null components. Any further operation of the carrier transducer will yield measured output voltages with the initial null signals summed. Therefore, the measured output signal will be an accurate indication of the test signal variance without any error due to initial offset conditions.

If another carrier transducer is used, the automatic zero circuit of the present invention can automatically re-zero itself to compensate for the new transducer. In such a case, switch 42 is activated in order to reactivate the control 36. Control 36 will command the counter means 31 to establish a new count based on the output of the remainder of the circuit in order to generate new null values from the second converting means 37.

Also, it is contemplated that a slight beam deflecture may occur in which the operator of the measuring device wishes to establish as a zero position. Once such a position is achieved, the operator again activates switch 42 to allow the automatic zero circuit of the present invention to re-zero itself for the new position.

The present invention also contemplates that it may be desirable to cancel only the phase component or the quadrature component of the output signal from the carrier transducer 16. In such a case, only one demodulator, filter, voltage control oscillator, and counter network would be utilized. For example, if it was desired to only cancel the quadrature component of the output signal from the carrier transducer 16, the output signal from summing amplifier 18 would be operatively connected only with 90° phase demodulator 22 and the accompanying filter, oscillator, counter and digital to analog converter. In that case, only the output from second digital to analog converter 40 would be operatively connected with summing amplifier 18.

Figure 6:
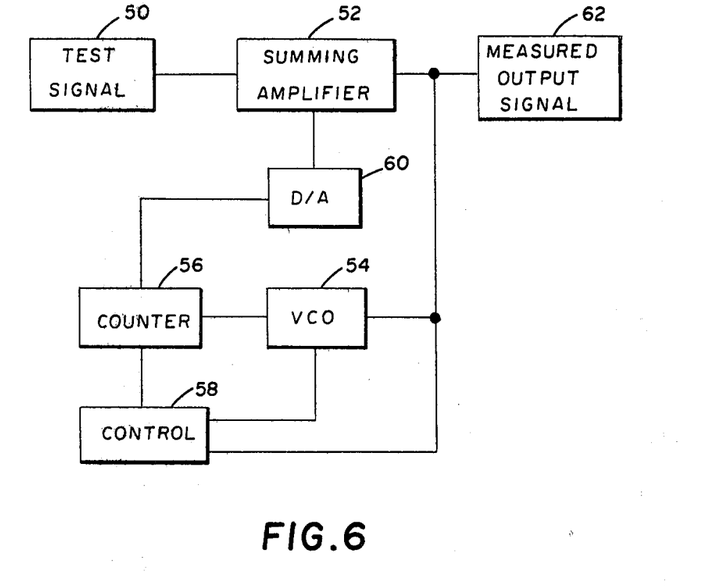
FIG. 6 is a block diagram of yet another embodiment of the present invention.

FIG. 6 shows another embodiment of the present invention in which it is contemplated that DC type transducers could be used. It is possible to have a resistor network used as a strain gage in which the output signal from the transducer will be a DC level. Offset problems will occur in these type of transducers caused by resistance in the lead lines, imperfect resistance values in the network, etc. It is desirable to nullify the initial DC offset signal from the transducer. A DC test signal 50 is received from a device sought to be measured. The test signal 50 is operatively connected to summing amplifier 52 to sum the test signal 50 with another signal. The output of the summing amplifier 52 is operatively connected to a voltage controlled oscillator 54 to generate a variable frequency whose value is determined by the DC level from the summing amplifier 52. The output of the voltage control oscillator is operatively connected to counter 56 to count the frequency of the voltage controlled oscillator and will output a digital signal indicative thereof. A control circuit 58 is provided which is operatively connected to the output of summing amplifier 52 and to the voltage controlled oscillator 54. Also, the control circuit 58 is operatively connected to counter 56. The control circuit 58 controls counter 56 and disables the counter at a point in time depending on the state of the output of the summing amplifier 52 and the voltage controlled oscillator 54. The counter 56 will hold the last count it was generating when the control circuit 58 gives the counter 56 the appropriate disable signal. Counter 56 is operatively connected to a digital to analog converter 60 to convert the digital output count from counter 56 into a DC analog level. The output of the digital to analog converter 60 is operatively connected to summing amplifier 52 and is the other signal summed with the test signal 50.

In operation, the summing amplifier 52 receives the test signal 50 which, for this example, has an initial DC offset. The summing amplifier 52 will output a DC level return signal to the voltage controlled oscillator 54. The counter 56 will begin to count the output frequency of the voltage controlled oscillator 54. The digital to analog converter will convert the digital count into a DC level which is summed with the test signal in summing amplifier 52. As those skilled in the art will appreciate, the polarities of the test signal and the output from the digital to analog converter are opposite in order that the resultant measured output signal 62 is zero. Once the summing amplifier 52 measured output signal 62 is equal to zero, the controller 58 will send an appropriate disable signal to counter 56 so that counter 56 will stop its count. The digital output signal from the counter 56 will be held so that the digital to analog converter 60 will continue to output the appropriate null signal. When the test signal changes due to changes in the transducer, the initial null signal from the digital to analog converter 60 will always be summed with it so that the measured output signal 62 will be an accurate indication of the test signal variance.

This invention has been described with reference to preferred embodiments. Modifications and alterations may occur to others upon reading and understanding this specification. It is my intention to include all such modifications and alterations insofar as they come within the scope of the appended claims or their equivalent thereof.

What is claimed is:

1. An automatic zero circuit for use with carrier transducers, said automatic zero circuit comprising:
   a reference generator for generating a phase reference signal and a quadrature reference signal, said transducer being operatively connected to said reference generator and powered by said reference generator;

a summing circuit operatively connected to said transducer for receiving a return signal from said transducer, for summing said return signal with at least one other signal and for generating an output signal equal to the summation of said return signal and said at least one other signal;

means operatively connected to said summing circuit for separating said output signal of said summing circuit into at least one component value with respect to said reference generator;

means operatively connected to said separating means for generating at least one DC signal with a value indicative of said at least one component value;

means operatively connected to said generating means for converting the value of said at least one DC signal into at least one modulated signal whose frequency is proportional to the value of said DC signal;

means operatively connected to said converting means for counting said at least one modulated signal; and means operatively connected to said counting means and said summing circuit for generating said at least one other signal in response to the count and being proportional to and opposite from said at least one component value, the output signal from said summing circuit being nulled.

2. The automatic zero circuit of claim 1 further comprising a control means operatively connected to said separating means, said converting means and said counting means for monitoring said output signal from said summing circuit and for stopping said counting means when said output signal of said summing circuit is completely nulled.

3. An automatic zero circuit for use with carrier transducers, said automatic zero circuit comprising:
a sinusoidal reference generator for generating a phase reference signal and a quadrature reference signal, said phase reference signal being operatively connected to said transducer, said transducer outputting a zero position signal typically having a phase component and a quadrature component defining a zero position offset signal;

means operatively connected to said transducer for summing the zero position offset signal with at least one other signal and for generating a signal indicative of the summation defining a measured output signal;

means operatively connected to said summing means for demodulating the measured output signal from said summing means with respect to at least one reference signal generated by said sinusoidal reference generator to determine at least one component value with respect to said at least one reference signal and for generating at least one demodulated signal output indicative thereof;

first converting means operatively connected to said demodulating means for converting said at least one demodulated signal into at least one direct current signal, said direct current signal being proportional to the output of the demodulating means;

oscillator means operatively connected to said first converting means for generating at least one modulating output signal whose frequency output is dependent upon said at least one direct current signal from said first converting means;

means operatively connected to said oscillator means for counting said at least one modulating output signal from said at least one oscillator means and for generating at least one signal indicative thereof defining an offset count;

second converting means operatively connected to said counting means for generating at least one sinusoidal signal indicative of said offset count and in phase with at least one reference signal from said sinusoidal reference generator defining a null signal, said second converting means operatively connected to said summing means and providing said at least one other signal for said summing means, said null signal cancelling at least one component of said zero position offset signal from said transducer thus causing at least one component of said measured output signal to be nulled.

4. The automatic zero circuit of claim 3 wherein said demodulator means includes;
a zero degree phase demodulator operatively connected to said phase reference signal for demodulating the measured output signal with respect to the phase reference signal, and
a 90° phase demodulator operatively connected to the quadrature reference signal for demodulating the measured output signal with respect to the quadrature reference signal.

5. The automatic zero circuit of claim 4 wherein said first converting means includes;
a first filter operatively connected to said zero degree phase demodulator, said first filter outputting a direct current signal indicative of the phase component of the measured output signal, and
a second filter operatively connected to said 90° phase demodulator, said second filter outputting a direct current signal indicative of the quadrature component of the measured output signal.

6. The automatic zero circuit of claim 5 wherein said oscillator means includes;
a first voltage controlled oscillator operatively connected to said first filter for outputting a frequency proportional to the direct current output from said first filter, and
a second voltage controlled oscillator operatively connected to said second filter for outputting a frequency proportional to the direct current output from said second filter.

7. The automatic zero circuit of claim 6 wherein said counting means includes;
a first up/down counter operatively connected to said first voltage controlled oscillator for counting the frequency outputted therefrom and for generating a count signal indicative thereof, and
a second up/down counter operatively connected to said second voltage controlled oscillator for counting the frequency outputted therefrom and for generating a count signal indicative thereof.

8. The automatic zero circuit of claim 7 wherein said second converting means includes,
a first digital to analog converter operatively connected to said first up/down counter for generating an analog null signal proportional to the count signal from said first up/down counter, and
a second digital to analog converter operatively connected to said second up/down counter for generating an analog null signal proportional to the count signal from said second up/down counter.

9. The automatic zero circuit of claim 8 wherein said first analog to digital converter is operatively connected to said phase reference signal from said sinusoidal reference generator for generating an analog signal in sequence with said phase reference signal and said second analog to digital converter is operatively connected to said quadrature reference signal from said sinusoidal reference generator for generating an analog signal in sequence with said quadrature reference signal.

10. The automatic zero circuit of claim 3 further comprising a control means operatively connected to said first converting means, said oscillator means and said counting means for monitoring when said automatic zero circuit has nulled at least one component of said measured output signal and to stop said counting means in its present offset count, said counting means then holding that count in order to maintain a nulled condition for at least one component.

11. The automatic zero circuit of claim 10 further comprising a reset switch operatively connected to said control means for resetting said control means to permit nullification for a different zero position offset signal from said transducer.

12. A method of automatically nulling the zero position offset signal from a carrier transducer, said method comprising the steps of:
   (a) generating a phase reference sinusoidal signal and a quadrature reference sinusoidal signal;
   (b) driving said transducer with said phase reference sinusoidal signal;
   (c) receiving the output signal from said transducer;
   (d) summing said received signal with at least one other signal;
   (e) demodulating the summed signal with respect to the phase reference and quadrature reference sinusoidal signals;
   (f) converting the demodulated signals into direct current signals;
   (g) generating frequency signals which are proportional to the direct current signals which were converted;
   (h) counting the frequency signals generated; and
   (i) converting the counter digital signals into a oscillating analog null signal in phase with the phase reference and the quadrature reference sinusoidal signals, the converted counter modulated signals being said at least one other signal.

13. The method of claim 12 further comprising the steps of:
   (j) monitoring said output signal; and
   (k) stopping said counting when said output signal is completely nulled.

14. An automatic zero circuit comprising:
a reference generator for generating a phase reference signal and a quadrature reference signal;
a summing circuit for receiving a return signal from a test device powered by one of the signals generated by said reference generator, for summing said return signal with at least one other signal and for outputting a signal indicative thereof;
means operatively connected to said summing circuit for automatically separating said output signal from said summing circuit into a phase reference component and a quadrature reference component with respect to said reference generator;
a first filter and a second filter respectively connected to the separated phase reference component and the separated quadrature reference component from the separating means, each filter generating a DC signal with a value proportional to its associated separated component;
a first and a second voltage controlled oscillator respectively connected to said first and second filter, each oscillator generating a modulated signal having a frequency proportional to the value of the DC signal from its associated filter;
measuring means operatively connected to said first and second voltage controlled oscillators for counting the modulated signal from each oscillator; and
second generating means operatively connected to said measuring means, to said reference generator and to said summing circuit for generating said at least one other signal, said at least one other signal having a phase reference component and a quadrature reference component, each with a value opposite the separated phase reference component and the separated quadrature reference component, the resultant summation of said at least one other signal and said return signal being a null.

15. An automatic zero circuit comprising:
a reference generator for generating a phase reference signal and a quadrature reference signal;
a summing circuit for receiving a return signal from a test device powered by one of the signals generated by said reference generator, for summing said return signal with at least one other signal and for outputting a signal indicative thereof;
means operatively connected to said summing circuit for automatically separating said output signal from said summing circuit into a phase reference component and a quadrature reference component with respect to said reference generator;
first generating means operatively connected to said separating means for generating a first and a second modulated signal, each modulated signal having a frequency proportional to a value of the separated phase reference component and the separated quadrature reference component;
a first and a second counter operatively and respectively connected to said first and said second modulated signal of said first generating means for counting the first and second modulated signals and for storing the count; and
second generating means operatively connected to said first and second counter, to said reference generator and to said summing circuit for generating said at least one other signal, said at least one other signal having a phase reference component and a quadrature reference component each with a value opposite the separated phase reference component and the separated quadrature reference component, the resultant summation of said at least one other signal and said return signal being a null.

16. An automatic zero circuit comprising:
a reference generator for generating a phase reference signal and a quadrature reference signal;
a summing circuit for receiving a return signal from a test device powered by one of the signals generated by said reference generator, for summing said return signal with two other signals and for outputting a signal indicative thereof;

means operatively connected to said summing circuit for automatically separating said output signal from said summing circuit into a phase reference component and a quadrature reference component with respect to said reference generator;

generating means operatively connected to said separating means for generating a signal indicative of the separated phase reference component and the separated quadrature reference component;

measuring means operatively connected to said generating means for measuring the generated signal from the generating means and for storing a first and a second digital indicia respectively indicative of a measured value of the separated phase reference component and the separated quadrature reference component; and a first and a second digital to analog converter operatively and respectively connected to said first and said second digital indicia from said measuring means, operatively and respectively connected to said phase reference signal and said quadrature reference signal from said reference generator and both operatively connected to said summing circuit, said first and said second digital to analog converter respectively generating a signal having a phase component and a signal having a quadrature component opposite the separated phase reference component and the separated quadrature reference component, said generated signals from said first and said second digital to analog converters being said two other signals, the resulted summation of said two other signals and said return signal being a null.

* * * * *

UNITED STATES PATENT AND TRADEMARK OFFICE
CERTIFICATE OF CORRECTION

PATENT NO. : 4,414,852

DATED : November 15, 1983

INVENTOR(S) : Thomas J. McNeill

It is certified that error appears in the above-identified patent and that said Letters Patent are hereby corrected as shown below:

In column 2, line 28, please change "another" to --Another--; and

In column 6, line 42, please change "zone" to --zero--; and

In column 8, line 40, please change "demoduator" to --demodulator--.

Signed and Sealed this

Twenty-fourth Day of January 1984

[SEAL]

Attest:

Attesting Officer

GERALD J. MOSSINGHOFF

Commissioner of Patents and Trademarks